United States Patent

[11] 3,599,788

[72] Inventors Robert D. Fyfe
Wheaton;
Victor Brown, Elmhurst, both of, Ill.
[21] Appl. No. 765,247
[22] Filed Oct. 4, 1968
[45] Patented Aug. 17, 1971
[73] Assignee Metropolitan Waste Conversion Corporation
Wheaton, Ill.

[54] METHOD OF WASTE THERMOPLASTIC REMOVAL
3 Claims, 3 Drawing Figs.

[52] U.S. Cl. .................................................. 209/11, 209/46
[51] Int. Cl. .................................................. B07b 13/00
[50] Field of Search .......................................... 209/2, 11, 45, 46

[56] References Cited
UNITED STATES PATENTS
581,908  5/1897  Gent et al. ................... 209/45
3,006,465  10/1961  James ........................... 209/45

Primary Examiner—Frank W. Lutter
Assistant Examiner—Ralph J. Hill
Attorney—Allegretti, Newitt & Witcoff ABSTRACT: Method of removing waste thermoplastic materials from an assortment of waste materials being conveyed past a thermoplastic removal station and consisting of a rotatable cylinder contacting the material due to its own weight and either driven by the movement of the conveying means or in synchronism therewith from an independent power source. The cylinder has a surface of contact with the materials, and means is provided to heat it to a temperature which softens the thermoplastic materials to a sufficient extent that they adhere to the heated surface and are carried away from the conveying means. To remove the softened and adhered thermoplastic materials from the cylinder, a scraper is provided contacting its surface and is effective to scrape the thermoplastic materials from the cylinder whereupon it may be carried away by a conveyor or the like.

PATENTED AUG 17 1971

3,599,788

Inventors:
Robert D. Fyfe
Victor Brown
By Baiz, Freeman & Molinare
Attys.

3,599,788

METHOD OF WASTE THERMOPLASTIC REMOVAL

BACKGROUND OF THE INVENTION

Various methods and apparatus or equipment are provided for the treatment of refuse such as household and industrial waste, garbage and the like. In one such apparatus the waste materials are reduced in a primary grinder whereupon by mechanical screeners, manual picking, magnetic separators and the like many of the waste materials may be removed leaving only such materials as nonferrous metals, plastic containers (film plastic having been removed), rags and the like. The nonferrous metals such as aluminum or the like can then be removed by manual picking and the rags by apparatus of the kind known in the art leaving plastic containers and other plastic shapes and other miscellaneous waste materials.

One object of our present invention is to provide a method which is effective to receive waste thermoplastic materials and other or remaining materials from waste separation equipment and to convey such materials past a thermoplastic removal station of the apparatus.

Another object is to provide a method of thermoplastic removal in the form of a removal element having a movable surface which is progressively engageable with the waste materials on the conveyor and heated to cause softening of the thermoplastic materials sufficiently to cause adherence thereof to the heated surface whereupon these materials are moved by the heated surface away from the conveying means.

Another object is to provide for scraping of the heated surface to remove the softened and adhered plastic materials therefrom before any part of the heated surface comes again in contact with the materials on the conveying means.

Still another object is to provide the heated surface in the form of a cylinder, and the cylinder of such weight that, by mounting it for free up-and-down movement, gravity holds the cylinder in contact with the waste materials on the conveyor with sufficient pressure to effect the desired softening of the thermoplastic materials and adherence thereof to the cylindrical surface.

A further object is to provide means for rotating the surface of the cylinder at substantially the same speed as the conveying means, either by utilizing the movement of the conveying means to effect such rotation due to the weight of the cylinder imposed on the conveying means or by synchronized independent power means.

Still a further object is to provide for removal of the thermoplastic materials from the vicinity of the scraper in the form of a conveyor passing under the scraper.

A BRIEF SUMMARY OF THE INVENTION

A method is provided which has a waste materials conveyor to convey miscellaneous waste materials which include thermoplastic materials past a thermoplastic removal station of the apparatus. A heavy, heated roller, mounted to float vertically, rests on the material on the conveyor and the heat of the roller softens the thermoplastic materials so that they adhere to the roller whereupon they may be scraped therefrom for removal from the vicinity of the roller, thereby producing a discharge from the waste materials conveyor which is free of thermoplastic materials. The remaining materials may then be treated in accordance with their composition, being ground and/or screened and/or composted and/or incinerated, etc.

DESCRIPTION OF THE PREFERRED EMBODIMENT

Figure 1:
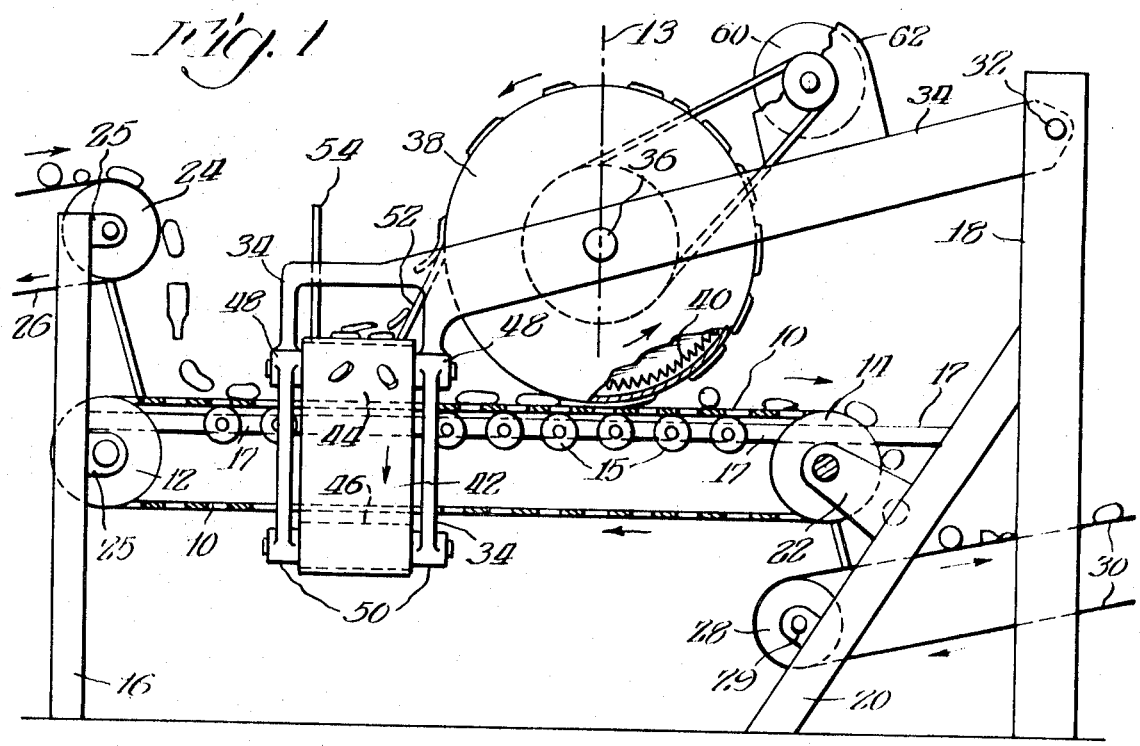
FIG. 1 is a semidiagrammatic, vertical side elevation and partially sectional view of a waste thermoplastic removal apparatus embodying our invention.

On the accompanying drawing we have used the reference numeral 10 to indicate a waste materials conveyor suitable for conveying waste materials including thermoplastic containers and other shapes of thermoplastic materials past a thermoplastic removal station indicated by the centerline 13. The conveyor 10 may be formed of metal slats to withstand the heat which is required in my apparatus, and is shown trained around rollers 12 and 14. The roller 12 may be journaled on frame elements 16 at the intake end of the conveyor whereas at the outgoing end thereof the roller 14 may be journaled in brackets 22 supported by frame elements 18 and 20. Preferably a series of freewheeling supporting rolls 15 are provided journaled on frame elements 17 to prevent undesirable sagging of the conveying (upper) stretch of the conveyor 10. Instead of rollers 12 and 14, the metal slats of the conveyor 10 may be mounted on chain links 13 passing around sprockets such as shown at 14a in FIG. 3.

A roller 24 is also journaled on the frame elements 16 and a delivery conveyor 26 is trained therearound for delivering miscellaneous waste materials to the conveyor 10 from, for instance, the primary grinder of the waste separation equipment above referred to after certain screening and other separating operations have been performed leaving certain materials including thermoplastic containers and other thermoplastic shapes.

At the outgoing end of the conveyor 10, a roller 28 is journaled on brackets 29 of the frame elements 20 and a remaining materials conveyor 30 is trained therearound for receiving the materials (with the exception of the plastic materials which have been removed) from the conveyor 10 and transferring them to further processing apparatus.

The frame elements 18 carry a pivot shaft 32 on which supporting arms 34 are pivoted and these arms journal a shaft 36. A cylindrical roller 38 is mounted on the shaft 36 and constitutes the thermoplastic removal element of my apparatus. As shown partially in section in FIG. 1 the roller 38 has a cylindrical surface which may be heated in any desired manner as, for instance, by an electric heating element 40 shown merely by way of example, or by oil burners, gas burners or the like.

A thermoplastic take-away conveyor 42 is shown trained around a pair of upper rollers 44 and a pair of lower rollers 46 for which bearings 48 and 50 respectively are provided. The bearings 48 and 50 are carried by extensions of the arms 34 beyond the shaft 36 as clearly shown in FIG. 1 for a purpose which will hereinafter appear.

The arms 34 also carry a scraper blade 52 positioned to scrape the surface of the cylindrical roller 38, and a barrier wall 54.

The foregoing described apparatus operates as illustrated in FIG. 1, the conveyor 10 being driven as by a motor 56 and a stepdown gearing unit 58, the conveyors 26 and 30 being also driven by the same motor if desired. Accordingly, the various elements of the apparatus move in the direction of the indicating arrows throughout the drawing, the conveyor 10 moving miscellaneous materials including thermoplastic materials toward the right in FIG. 1 under the heated removal roller 38. This roller is heated so that its surface attains a temperature suitable for softening the thermoplastic materials whereupon they adhere to the surface and are carried away from the conveyor 10, up over the cylinder (which may be rotated counterclockwise, either by its contact with the materials on the conveyor 10 or independently as by driving it by means of a motor 60 through a stepdown gearing unit 62) until they reach the scraper blade 52. Thereupon they are scraped from the surface of the roller and deposited on the take-away conveyor 42.

Figure 3:
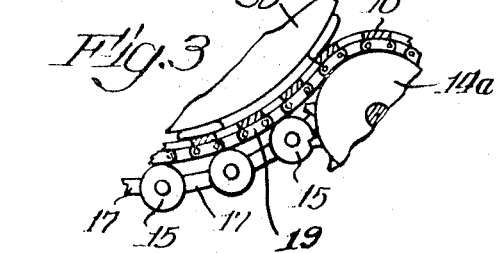
FIG. 3 is a partial side elevation of a modified form of the invention.
Figure 2:
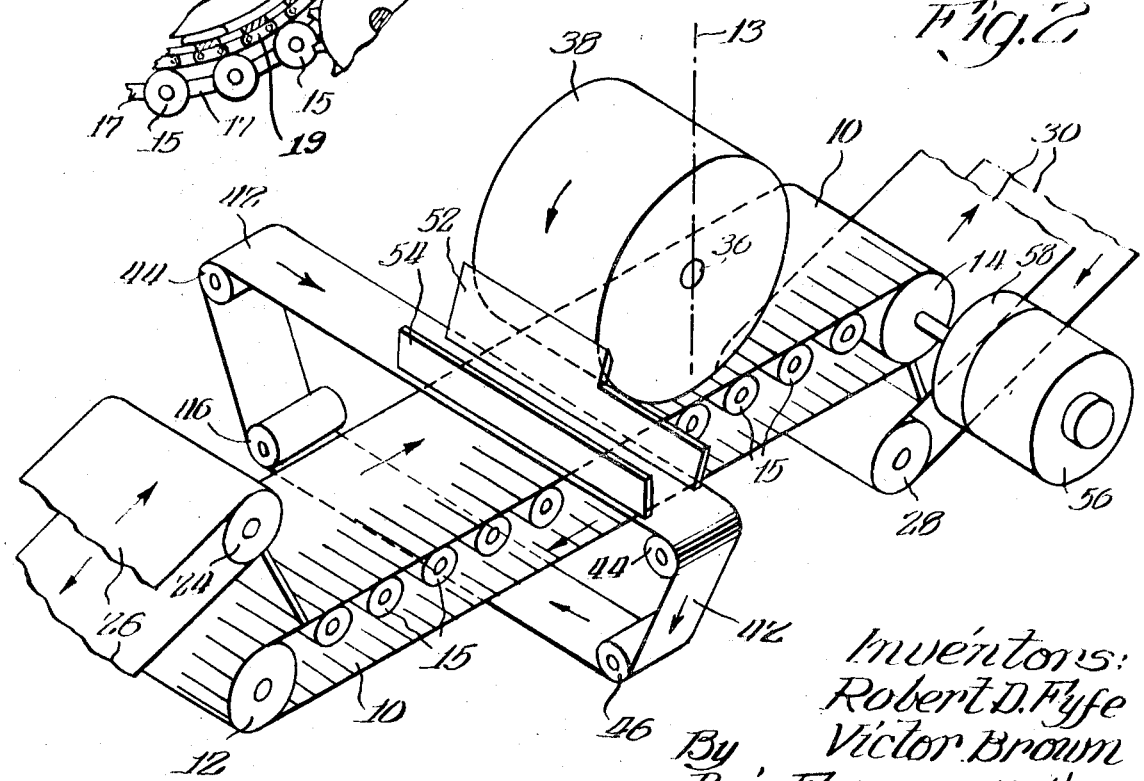
FIG. 2 is a diagrammatic perspective view thereof showing only the essential operating elements thereof.

If the scraper blade 52 introduces such friction as to interfere with rotation of the roller 38 by reason of its contact with the materials on the conveyor 20, the motor 60 can be used and rotates the roller at preferably the same peripheral surface speed as the conveyor as by proper synchronization of the stepdown gearing units 58 and 62. In order to give the roller 38 more time to apply heat and pressure to the thermoplastic waste material and thereby insure adherence thereof to the surface of the roller, the conveyor 20 may be designed as in FIG. 3 to curve some distance around the roller. FIG. 3 also shows a sprocket (14a) and chain (19) arrangement in place of the disclosure 10, 12, 14 of FIGS. 1 and 2.

By mounting the cylindrical roller 38 for free vertical floating action (due to the pivoting of the supporting arms 34 at 32), and making the roller of considerable weight, it will soften and flatten the thermoplastic materials as illustrated. Due to the adherence thereof to the surface of the roller 38, they are separated from the other waste materials which are passed on by the conveyor 10 to the conveyor 30. The scraper 52 then effects removal of the softened and flattened thermoplastic materials adhering to the surface of the roller 38 and deposits them for take-away by the conveyor 42. Since this conveyor as well as the scraper blade 52 are carried by the pivoted supporting arms 34, they are always in the same relationship to the surface of the roller 38 for effective scraping action on its surface.

From the foregoing specification it is obvious that a simple apparatus is provided for effectively separating thermoplastic materials from other waste materials by a process of softening and adherence, for removing the separated thermoplastic materials from the other waste materials, and for removing the adhered materials by scraping action.

We claim as our invention:

1. A method for removing thermoplastic materials from household and industrial waste material containing garbage, metal, paper and said thermoplastic material, said thermoplastic material being characterized by becoming adhesive at elevated temperatures, comprising the steps of:
   a. moving waste containing thermoplastic material in a continuous path of travel from a first location to a second location,
   b. interposing a continuously moving surface in said path of travel between said first and second locations,
   c. contacting said waste moving in said path of travel with said moving surface,
   d. maintaining said continuously moving surface at a temperature sufficient to soften said thermoplastic material and render it adhesive so that upon contact thereof with said waste said thermoplastic material adheres to said heated and moving surface,
   d. moving said heated and moving surface with said thermoplastic material thereon from said path of travel, and
   e. removing said thermoplastic material from said heated and moving surface.

2. A method for removing thermoplastic material from household and industrial waste material containing garbage, metal, paper and said thermoplastic material, said thermoplastic material characterized by becoming adhesive at elevated temperatures, comprising the steps of:
   a. transporting waste containing thermoplastic materials from one location to another,
   b. heating a continuously moving surface located intermediate said first and second locations to a temperature sufficient to soften said thermoplastic material and render it adhesive,
   c. contacting said continuously moving heated surface with said waste so that said thermoplastic material adheres to said heated surface,
   d. moving said heated surface with said thermoplastic material adhered thereto out of contact with said waste, and
   e. removing said thermoplastic materials from said heated surface.

3. A method for removing thermoplastic material from household and industrial waste material containing garbage, metal, paper and said thermoplastic material, said thermoplastic material being characterized by becoming adhesive at elevated temperatures, comprising the steps of:
   a. transporting waste containing thermoplastic materials from one location, past an intermediate thermoplastic removal surface, to a second location,
   b. maintaining said thermoplastic removal surface at a temperature sufficient to soften said thermoplastic material and under it adhesive,
   c. moving said heated thermoplastic removal surface at the same speed as said transported waste,
   d. contacting said transported waste with said moving heated thermoplastic removal surface whereby said thermoplastic material adheres to said heated surface,
   e. moving said heated surface with said thermoplastic material adhering thereto out of contact with said transported waste, and
   f. removing said thermoplastic material from said heated surface.